US008023136B2

(12) United States Patent
Dugas

(10) Patent No.: US 8,023,136 B2
(45) Date of Patent: Sep. 20, 2011

(54) UNIVERSAL SCAN TO STORE SYSTEM AND METHOD OF USING THE SAME

(76) Inventor: Patrick J. Dugas, Winter Haven, FL (US)

( * ) Notice: Subject to any disclaimer, the term of this patent is extended or adjusted under 35 U.S.C. 154(b) by 849 days.

(21) Appl. No.: 12/049,044

(22) Filed: Mar. 14, 2008

(65) Prior Publication Data

US 2008/0174831 A1    Jul. 24, 2008

Related U.S. Application Data

(63) Continuation-in-part of application No. 10/448,079, filed on May 30, 2003, now abandoned.

(51) Int. Cl.
*G06K 15/00* (2006.01)
*G06F 3/12* (2006.01)

(52) U.S. Cl. ..................... 358/1.15; 358/1.18
(58) Field of Classification Search ............... 358/1.15, 358/1.18, 500, 501, 400, 401, 443, 1.16, 358/444, 404
See application file for complete search history.

(56) References Cited

U.S. PATENT DOCUMENTS

| | | | | |
|---|---|---|---|---|
| 6,897,891 | B2* | 5/2005 | Itsukaichi | 348/14.1 |
| 6,992,799 | B1* | 1/2006 | Chen | 358/442 |
| 2005/0057780 | A1* | 3/2005 | Fujita et al. | 358/400 |
| 2006/0227362 | A1* | 10/2006 | Yamagata et al. | 358/1.14 |
| 2007/0156705 | A1* | 7/2007 | Tsuya | 707/10 |
| 2007/0211310 | A1* | 9/2007 | Kadota | 358/474 |
| 2008/0109457 | A1* | 5/2008 | Arita et al. | 707/100 |

* cited by examiner

*Primary Examiner* — Jerome Grant, II

(57) ABSTRACT

A free-standing universal scanner driving device includes a small, light-weight, portable, slow-speed, low memory processor with no monitor or keyboard, and programmed only to support a scanner; a memory having only enough capacity to hold a scanner driver; a slot for receiving an external storage medium; input and output ports; means for writing data on the external storage medium; a housing case; optionally an external numeric keypad; and one and only one push-button, touch pad, or touch screen for initiating an external optical scanner to scan a document placed in the scanner and then directly write the scanned electronic data into the external storage medium by pushing the button, without requiring any setup input from the user. The push-button, touch pad, or touch screen being integrally formed on the case.

1 Claim, 5 Drawing Sheets

UNIVERSAL SCAN TO STORE SYSTEM AND METHOD OF USING THE SAME

RELATED U.S. APPLICATION DATA

This application is a continuation-in-part of U.S. patent application Ser. No. 10/448,079 filed May 30, 2003.

TECHNICAL FIELD

This invention relates generally to a single touch "scan to store" system. In particular the system includes a portable, free-standing universal scanner driver device for a person to scan a document via a scanner directly to a storage media therein from a single interaction with any scanner available in-situ.

BACKGROUND OF THE INVENTION

Document scanners are widely used for both business and home purposes. The optical scanner market continues to explode. Optical scanners differ from one another in terms of scanning technology, resolution, bit depth, size and shape. There are hand-held scanners, sheet-fed scanners, flatbed scanners (like photocopy machines), and overhead scanners (like overhead projectors).

An optical scanner reads text or images printed on paper and translates the information into digital data to be stored in a file, displayed on a screen, and manipulated by programs. Most optical scanners do not distinguish text from images (represented as bit maps). Therefore, a computer is required to edit text. To translate the image into ASCII characters, an optical character recognition (OCR) software is required to be installed in the computer. Typically, an analog-to-digital converter in the scanner processes the analog signal to generate a digital representation of this image. Most optical scanners sold today come with OCR packages. Current scanners require a variety of user intervention to carry out the scanning process and effectively store the document on a storage device, such as a disk, CD, or network share.

For example, HP ScanJet II cx is compatible with Macintosh and IBM compatible PC's. For the Macintosh hardware, the scanner can be connected directly to an existing SCSI interface. The recommended requirements for the Macintosh include: 5-8 megabytes of RAM (the minimum is 4), 6 megabytes of available disk space for installation of software (DeskScan II and/or Adobe Photoshop), and operation system software version 7.0 or greater (minimum is 6.0.7). For the PC the scanner requires an adapter card to be installed in the system. The software that does the actual scanning is called DeskScan II (on both Macintosh and PC). The image processing software is Adobe Photoshop for the Macintosh; and Aldus PhotoStyler and Image Assistant for the PC. The DeskScan II software does the actual scanning and includes some adjustments. The following are a few of the adjustments that can be made: adjusting the selection area, changing exposure settings, choosing a new image type, sharpening the image, or scaling the image to the right size. To enhance the images beyond what DeskScan offers requires image processing software such as Adobe Photoshop for the Macintosh, or Aldus PhotoStyler and Image Assistant for the PC.

U.S. Pat. No. 6,166,830 shows an integrated scan-to-store apparatus having a single housing unit, a flatbed scanner, a CPU, a monitor/screen, commands for controlling or making adjustments on a control panel, and a storing means disposed within. It further shows an integrated scan-to-store apparatus that allows images to be scanned and stored on a removable data/storage device. While it eliminates the need for a separate computer, it also eliminates the compatibility with any existing scanners by building a completely new scanner to include a CPU, monitor, scanner, and memory storage device as a single unit. In addition it still requires instructions from the operator and certain computer navigation procedures in order to allow choices to include: scanning, manipulating/adjusting, and storage. In particular it requires a high-powered CPU along with an extensive RAM and cache memory system, as well as various ports to allow this device to interface with other apparatus. In other words it compromises existing scanner design in exchange for a "self-contained, integrated configuration" in a stand-alone apparatus including a single housing (having a top surface and an interior space defined beneath said top surface), a high-end CPU processor, some "imagined" miniature monitor, and some sort of abbreviated keyboard.

U.S. patent application Publication No. 2002/0051242 shows an integrated scan-to-store apparatus having a CPU, a removable storage medium, and a control system displaying digital images. It further shows stand-alone flatbed scanner controls for controlling the mode of operation, degree of resolution, and related parameters associated with generating, storing, and displaying digital data, which requires substantially more input from an operator than U.S. Pat. No. 6,166,830 to control functions, such as: mode of operation, color or black and white, high-low-medium resolution, LCD display use, erase control, image advance and data compression, in addition to other "operator controlled functions." It also includes ports for peripherals, an internal hard drive, and software adapted to display images directly on a screen. This application shares the same problem as U.S. Pat. No. 6,166,830, and it additionally incorporates a special carriage adapted within the unit with a digital camera positioned on this carriage so as to either conventionally scan a document or take a digital picture of the document. The digital camera picture would also allow viewing on a conventional TV set, and an adapter to couple an auto document feeder.

U.S. Pat. No. 4,943,868 encompasses a compact, lightweight image data filing apparatus with an IC memory card as an image data storing medium, and is primarily designed to be coupled with a hand-held scanner rather than being universally compatible with most optical scanners. Image data on an object such as a name card is read by the hand scanner, and filed into the IC memory card. The read data is stored into the IC memory card, together with an ID entered via the keyboard for identifying the image data to be stored. The image data is specified by the ID entered and displayed by a liquid crystal display device. As such, it requires additionally a keyboard for entering ID's and a display for displaying the image data.

Currently there is a demand for a portable, free-standing universal scanner driving device for a unskilled operator to scan a document directly to a storage media therein from a single interaction with any scanner available in-situ.

SUMMARY OF THE INVENTION

It is a purpose of this invention to provide a self-contained, portable, and universally compatible scanner driving device for any existing, unmodified scanner to be "plugged" into.

It is another purpose of this invention to eliminate the need for program navigation, a separate computer, monitor and keyboard.

It is still another purpose of this invention to provide an easy-to-use, single touch "scan to store" system.

DESCRIPTION OF THE PREFERRED EMBODIMENTS

Figure 1:
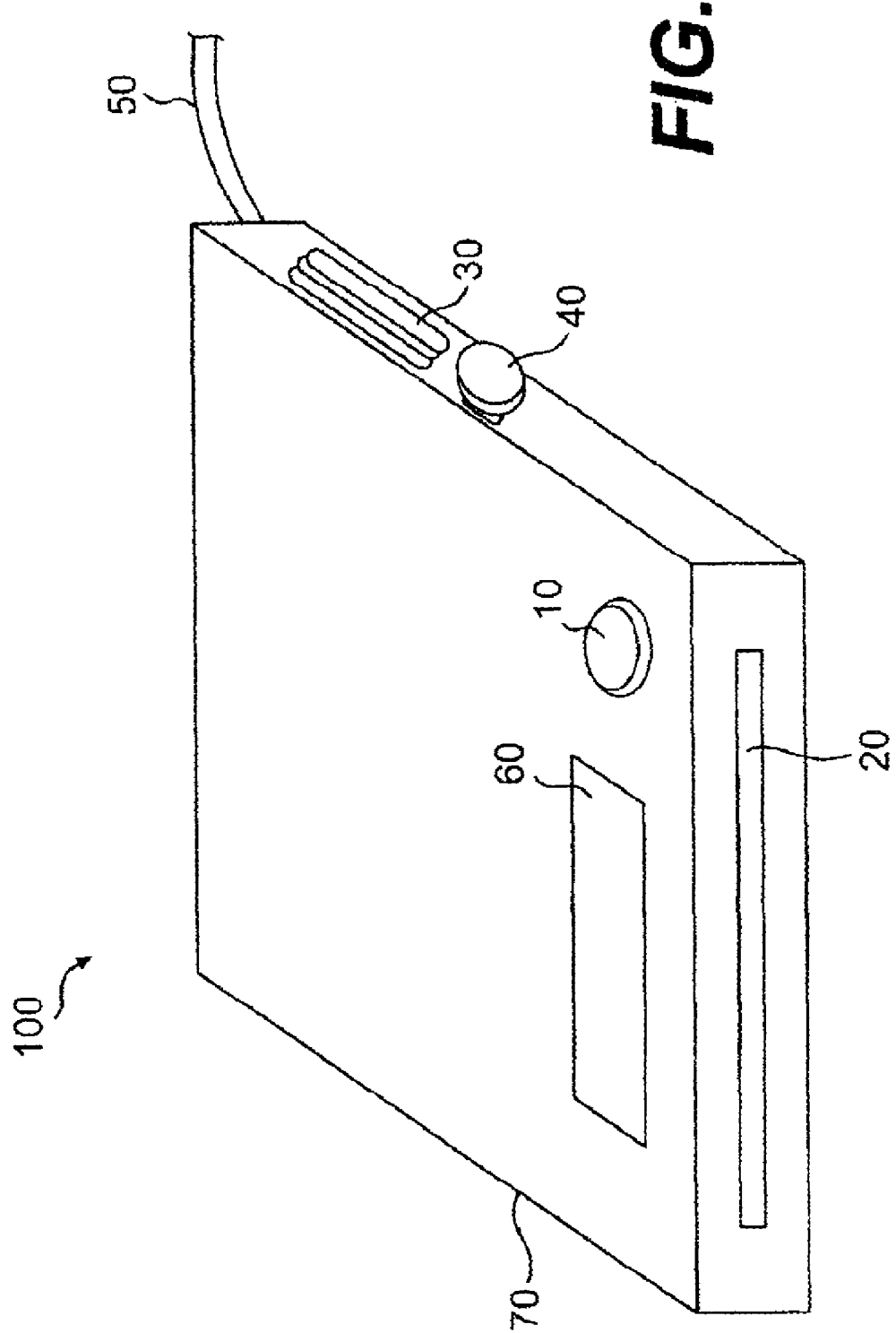
FIG. 1 shows a portable, free-standing, universal scanner driving device according to the invention.

With reference to the figures, like reference characters will be used to indicate like elements throughout the several embodiments and views thereof.

Although the one-touch scan-to-store device of the present invention may incorporate any of a push-button, touch pad, or touch screen, FIG. 1 shows the scan-to-store device 100 according to the invention to be connected with an external optical scanner, having a single push-button 10, a slot 20 for receiving a storage medium such as a floppy disk, a slow-speed, low capacity processor and algorithms for manipulating a scanned image and saving it to the storage medium, a female RS-232 connector 30, a female DIN connector 40, a power cable 50, a LCD display 60 for displaying textual user information, and a housing case 70. Although not shown in FIG. 1, ports such as a USB port also may be provided for an external LCD display, numeric or alpha-numeric keypad, storage media, etc.

Figure 2:
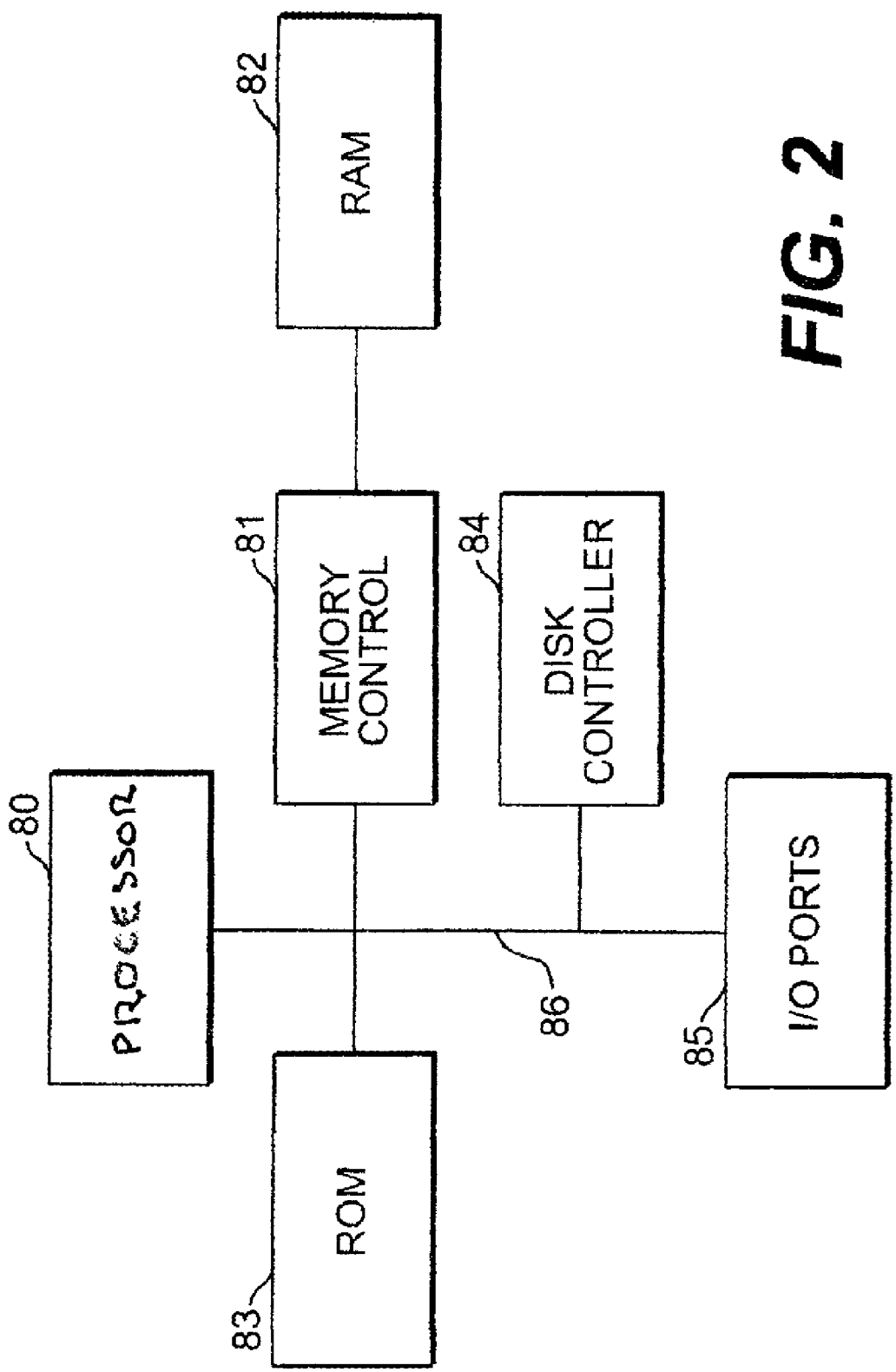
FIG. 2 is a block diagram showing one embodiment of the hardware structure of the driving device of FIG. 1.

FIG. 2 is a block diagram of the components inside the one-touch scan-to-store device 100, including a slow speed, low-capacity processor 80, a memory control 81, a RAM 82, a ROM 83, a disk controller 84, input/output ports 85 and buses 86 (the data bus, the address bus, and the control bus) on a board of 2 inches by 2.5 inches by 0.5 inches. Because the device 100 incorporates a much slower CPU chip than a computer and much reduced RAM, the size of the internal cooling fan is significantly reduced or eliminated altogether. The invention merely includes a very low capacity processor with sufficient power and memory to drive an existing stand-alone scanner. The speed of the processor and the size of the RAM are contingent on the scanner and its driving software.

Like other processors, the processor 80 includes a ALU (Arithmetic Logic Unit), internal registers, and CU (control unit) for sequencing the system. The processor has three buses, a bi-directional data bus, mono-directional address bus, and a control bus. The data bus carries data between various components of the system, typically from memory to the processor or input/output controller. The address bus carries an address generated by the processor, which will select one internal register within one of the chips attached to the system and specifies the source or destination of the data which will carry along the data bus. The control bus carries various synchronization signals. The processor needs some sort of clock to synchronize the precise timing references of the system.

The input/output ports 85 include an input parallel port for inputting data from an optical scanner and an output port for outputting data to a storage medium. A standard parallel cable consisting of 25-pins that transfer information one byte at a time is used with the parallel port, such as a unidirectional, 4-bit parallel port. Preferably, the output port is a USB port. USB ports are very fast and have two data speeds: 12 mbps for devices such as scanners, printers, monitors, and modems.

The memory controller 81 controls data reading from and data writing to the memory, including the RAM 82 and ROM 83, while the disk controller 84 controls data reading from and data writing to a disk.

Power is supplied via a transformer which converts the 120 volt, 50 Hz, AC current into +5- and +12 volt DC current, and a +3.3 volt as well on some systems. Usually the digital electronic components and circuits in the system (motherboard, adapter cards, and disk drive logic boards) use the 3.3 volt or +5 volt power, and the motors (disk drive motor and any fans) use the +12 volt power.

To simplify the device and its functions, the device does not include any co-processor, sound cards, graphic cards, or E-IDE interfaces.

Instead of a floppy disk, the disk controller and slot may accommodate a Hard Disk, an Optical Disk, a tape, a CD, a Worm, an Erasable, a Zip Disk, a DVD, a flash Memory Card, a Super Disk, media card, or a combination of two or more of these storage media. Alternatively, any such storage medium may be controlled by an external driver, although an internal CD burner would allow for the greatest compatibility with drivers.

The ROM and RAM may be substituted by a Programmable Read-Only Memory (PROM), an Erasable Programmable Read-Only Memory (EPROM), a Magnetic Disk, a Magnetic Tape, a Magnetic Drum, or Magnetic Disk, which will increase the performance of the device at the price of size and cost.

The operating system can be one of: Proprietary Software, Windows 2000, Windows 2000 Professional, Windows 2000 Server, Windows Server 2003, Windows XP, Windows NT, Windows ME, Windows 98, Windows 95, Windows 3.11, Windows-Longhorn, MS-DOS, PC-DOS, MXS, Mac OS X. Classic Macintosh, OS/2, Linux, Unix, NetBSD, OpenBSD, GNU Hurd, Solaris, SunOS, HP-UX, OpenVMS, Tru64, IRIX, NeXT, Rhapsody, AIX, MVS, NetWare, BeOS, AmigaOS, SCO OpenServer, SCO UnixWare, Pyramid, and BSDi. The application programming interfaces (API's), such as TWAIN, are available for each device and the chosen operating system will determine how much custom programming is required for this software.

The device 100 is designed to complement any existing scanners or their future designs. The miniaturized, slow-speed, low-memory, "computer substitute", is small, lightweight and very portable. It can be connected (by AC plug and ISB cable for example) to, e.g., a flat bed scanner, without requiring or causing any modification to the scanner itself. This device 100 is totally separate from the scanner and is simply a substitute for the much larger, more powerful, more expensive, and much more complicated to operate computer. This design, by contrast, is only programmed to support a scanner, thereby allowing operator input to become as simple as operating a copy machine.

When used with an operating system that supports USB, devices can be added and removed without powering down or reconfiguring the system. When a device is added or removed, the system automatically detects the change and then loads or unloads the appropriate driver.

The stand-alone scanner driving device 100 is easy to operate. Once it is connected with an optical scanner, the assembly works as easily as a simple copy machine, which does not require a computer, monitor, or keyboard. As such the operation does not require the user to be computer literate. Because the unit would require less processing capabilities compared to today's computer technology, obsolete computer components can be used to manufacture the device.

Figure 3:
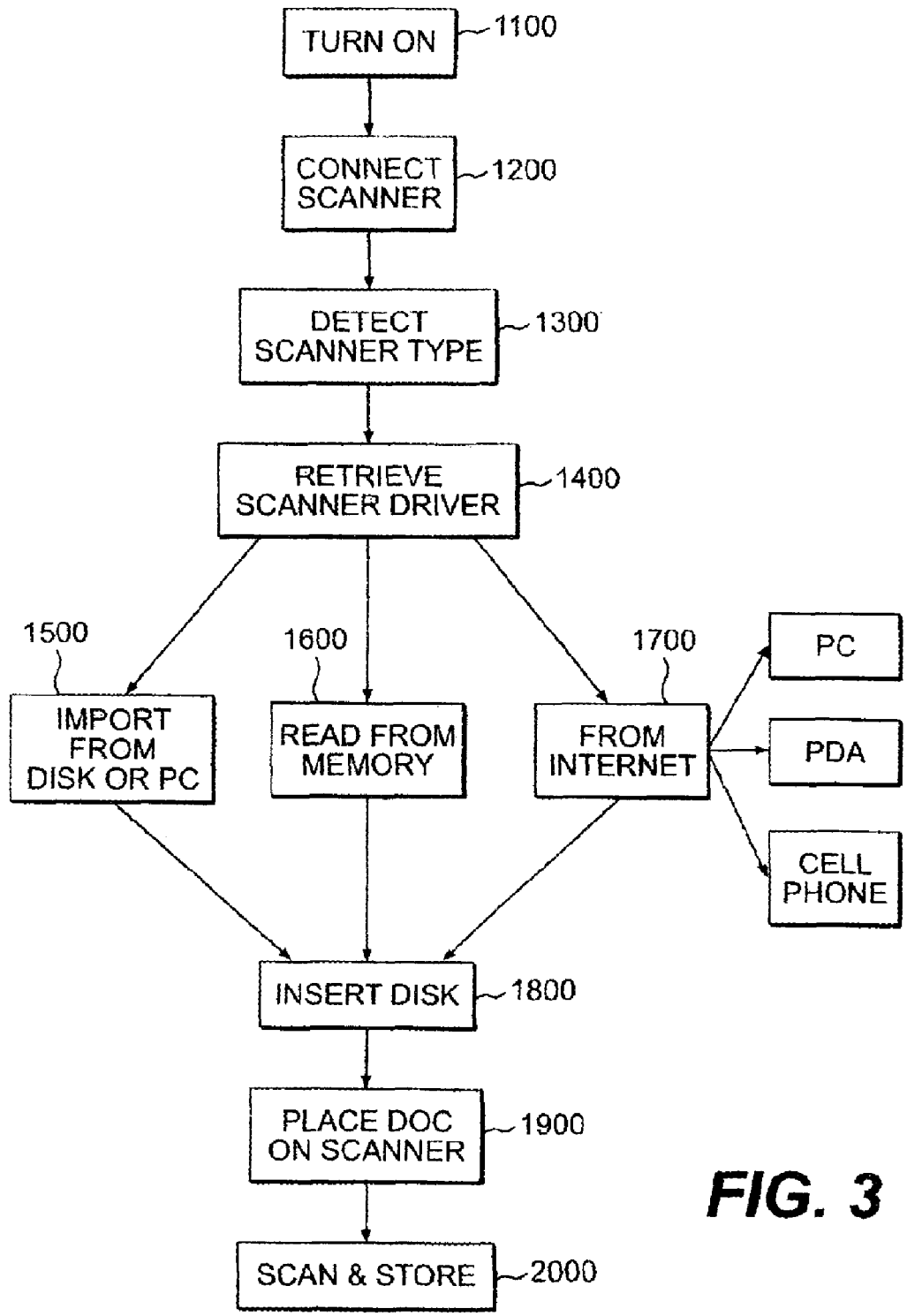
FIG. 3 is an operation flow chart of the driving device of FIG. 1.

According to the flow chart in FIG. 3, the user first turns on the device 100 power (Step 1100) by pressing the button 10 until hearing the power-up chime. Once power is on the LCD display 60 displays "Connect Scanner then Press Button" prompting the user to connect the device 10 to a scanner. The user connects the device to a scanner (step 1200) followed by pressing button 10. The device 100 detects the type of scanner (step 1300) and retrieves the scanner's driver for supporting its operation with a specific operating system (step 1400). The retrieving process may be conducted via three ways: 1. Importing the scanner driver software from a storage medium received by the slot 20 or from a computer (step 1500); 2. Reading from the ROM 83 a pre-stored scanner driver (step 1600); or 3. downloading the scanner driver software via a computer, a PDA, or a cell phone from the internet (step 1700). In one embodiment, the device 100 is ordered on-line by an end user with at least one specific scanner driver installed. In another embodiment, the device 100 is pre-stored with at least one popular scanner driver. In this embodiment, the input button 10 and the LCD are replaced by a one touch panel on which different scanner drivers are displayed for a user to choose. Accordingly, the device 100 automatically configures a connected scanner ("connect-and-scan"). A user can connect the device 100 with a scanner and scan documents with the scanner without worrying about setting hardware or data transmission configurations.

If the device 100 cannot initialize due to the unavailability of its driver, the LCD display displays "Initialization Failed".

Optionally the LCD display 60 may display the brand name and model number of the scanner. The LCD display 60 then displays "Insert Disk" after the scanner driver is retrieved. The user inserts a disk or the like into the slot 20 in step 1800. The LCD display then displays "Place Doc" to prompt the user to place a to-be-scanned-document in the scanner (step 1900). The LCD display displays "Push to Scan & Store" to control the device 100 to scan the document and store the information into the disk (step 2000).

There is one default graphic file type in the device 100. However, in another embodiment the device supports many different graphic file types, such as bmp, jpg, tif, gif, png, and others. In this embodiment a variety of file formats are shown on the touch panel in the Save As dialog for the user to choose depending on how or where the file, image, or picture will be used. For example, scanning images for use on the World Wide Web is different from scanning images for printing.

Figure 4:
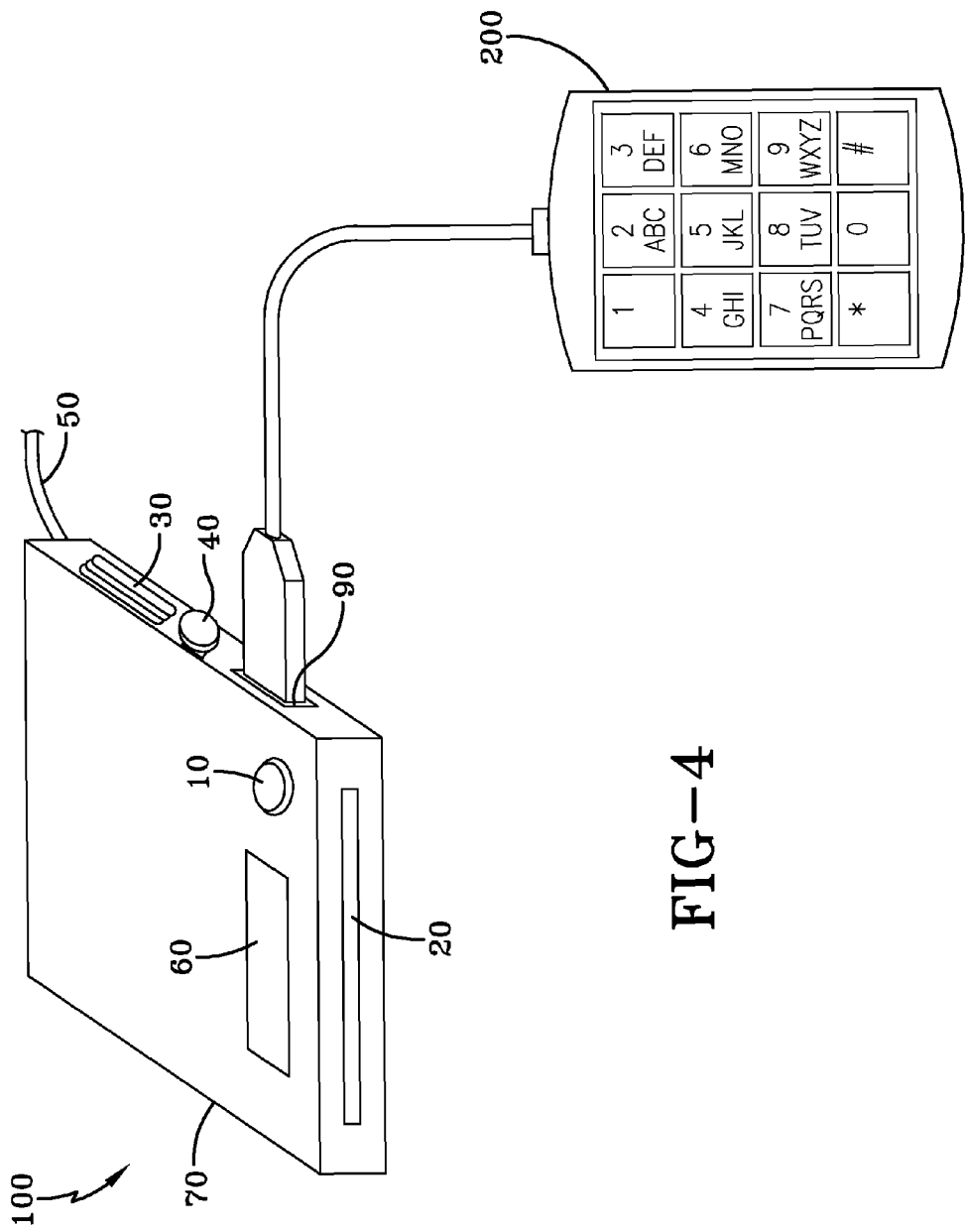
FIG. 4 shows another embodiment of the portable, free-standing, universal scanner driving device according to the invention.

FIG. 4 shows second embodiment of the invention in which the universal scanner driving device 100 also includes an external alpha-numeric keypad 200 connected via one of the ports, and appropriate software that allows the user to store multiple multi-page scanned documents in separate folders with meaningful filenames and sequentially numbered pages. Thus, the user can enter a document name via the alpha-numeric keypad 200, push a control key on the keypad to indicate that a new document is being scanned, and then push the push-button 10 on the device 100 whereupon the system will automatically scan the document and save it into a new folder with a new page number sequence. Alpha-numeric keypads generally are small devices, such as those commonly found in cellular telephones and PDA's, which as a stand-alone device can be connected to device 100 using, for example, a USB cable and port.

Figure 5:
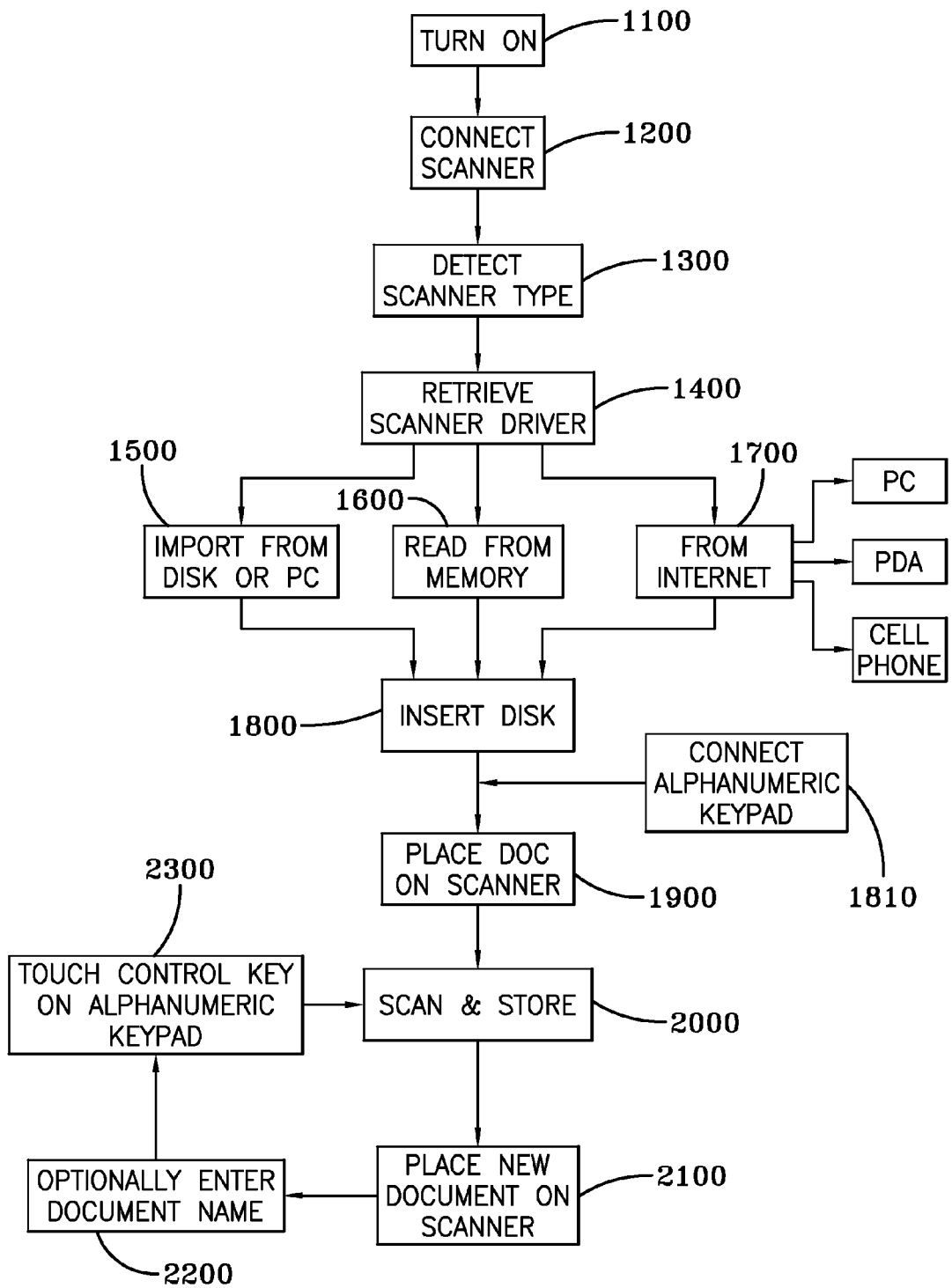
FIG. 5 is an operation flow chart of the driving device of FIG. 4.

According to the flow chart in FIG. 5, the user of the second embodiment of the universal scanner driving device follows steps 1100 to 1800 in the same manner as the user of the first embodiment. The user then connects an alpha-numeric keypad to a port in device 100 (step 1810). After placing a new document on the scanner (step 2100) the user optionally may enter a document name using the alpha-numeric keypad (step 2200), touch a control key on the numeric keypad 200 to indicate that a new document is to be scanned (step 2300), and push the push-button 10 on device 100 (step 2000), whereupon the system automatically scans the document and saves it into a new folder with a new page number sequence.

Both the LCD display and the alpha-numeric keypad may require custom programming. This would depend on the implementation used by the hardware vendor.

Benefits Enjoyed By Business Users:
Part-time clerks can copy files with no more training than using a copy machine;
Does not tie up a computer in the business office;
easily portable to be used in a convenient, out-of-the-way location (i.e. spare conference room or file room, etc.) However, be sure to use a scanner lock if the scanner is so equipped;
Very inexpensive to own and maintain;
Eliminates unauthorized access to computer files (by eliminating the need to access a computer);
"Computer Substitute" or "Converter" is small and light-weight;
Storage space premium—scanner driver device can be easily stored in a desk drawer, file cabinet, etc.;
Will transfer data to any number of storage media, i.e., if a floppy disk is installed the data will be stored there; if no floppy disk is detected, the device will automatically send the data to ISB port (or other) for external hard drive, zip drive, CD burner or any other removable storage device or to a modem for internet access;
Professional offices will be able to give a client, customer, or patient an electronic copy of a report or document instead of, or in addition to, a traditional paper copy without having to rely on computer literate staff to prepare the copy;
Portability allows a traveling professional, such as a salesman, auditor, or lawyer, to take the universal scanner driving device into the field;
The universal scanner driving device may be installed as a pay-per-use option in a post office, bank, retail store, mall, airport, library, etc., and will encourage infrequent users who may not own a scanner to copy, store, or later transmit documents or pictures to friends or relatives, and medical, financial, accounting or legal offices; i.e., medical records to a new doctor, closing documents to a bank, tax documents to an accounting office, or an updated draft contract to a law office.
Benefits Enjoyed By Individuals:
Many of the same benefits enjoyed by business users;
Overcomes the objection that it is too much trouble to hook up a computer, install new software, etc.;
Overcomes the objection that once the device is connected it takes up too much room;
Overcomes the objection that it is too complicated to learn how to navigate, edit, or use in general;
Portable, stand alone, can routinely copy bills, etc. for filing and storage on a floppy or other removable storage device (compares in convenience to a stand alone CD burner or photo printer);
Benefits Enjoyed By Commercial Manufacturer:
Creates a substantial number of new customers/users for their existing scanner products;
Creates a new and worth-while product to sell to owners of existing scanners;
Creates a very attractive marketing "option" to include the unit with the purchase of a scanner using manufacturers rebates, etc.;

Is manufactured from obsolete computer parts, i.e., slower CPU chips, much smaller hard drives, etc. thereby converting obsolete component inventory into a profit center, or allowing for the purchase of obsolete parts at bargain prices to allow either exceptionally high mark-ups or inexpensive marketing options;

Creates completely new leasing/sales opportunities for pay-for-use facilities;

Can be programmed to be compatible only with the sellers brand of scanners to give their brand a competitive advantage;

Does not make any of their scanners or other products obsolete.

The principles, preferred embodiments, and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes, and equivalents which fall within the spirit and scope of the present invention as defined in the claims be embraced thereby.

What is claimed is:

1. A method for scanning a document and storing scanned electronic data, comprising:

providing an optical document scanner, a storage medium, and a free-standing universal scanner driving device comprising a slow-speed, low capacity processor with no monitor or keyboard, and programmed only to support a scanner; a memory having only enough capacity to hold a scanner driver; a slot for receiving an external storage medium; input and output ports for inputting data from an optical scanner and outputting the scanned electronic data to a storage medium; means for writing data on the external storage medium; an external alpha-numeric keypad connected to the device via one of the ports; a housing case; and one and only one push-button, touch pad, or touch screen for initiating an external scanner to scan a document placed in the scanner and then directly write the scanned electronic date into the external storage medium by pushing the push-button, touch pad, or touch screen without requiring any setup input from the user, said push-button, touch pad, or touch screen being integrally formed on the case;

connecting the driving device to the scanner;

connecting the alpha-numeric keypad to the driving device;

inserting a storage medium into the slot;

placing a document in the scanner;

optionally entering a document name via the alpha-numeric keypad;

pushing the control key on the alpha-numeric keypad to indicate a new document to be scanned; and pushing the push-button, touch pad, or touch screen to initiate the external optical document scanner to scan a document put in the scanner and directly write the scanned electronic data into the external storage medium in a new folder with a new page number sequence, without requiring any setup input from the user.

* * * * *